(12) United States Patent
Auerbach

(10) Patent No.: US 9,377,024 B1
(45) Date of Patent: *Jun. 28, 2016

(54) NOVELTY HAND-HELD FAN AND OBJECT HOLDER

(71) Applicant: Candyrific, LLC, Louisville, KY (US)

(72) Inventor: Robert C. Auerbach, LaGrange, KY (US)

(73) Assignee: Candyrific, LLC, Louisville, KY (US)

( * ) Notice: Subject to any disclaimer, the term of this patent is extended or adjusted under 35 U.S.C. 154(b) by 552 days.

This patent is subject to a terminal disclaimer.

(21) Appl. No.: 13/912,952

(22) Filed: Jun. 7, 2013

Related U.S. Application Data

(63) Continuation of application No. 11/062,236, filed on Feb. 21, 2005, now Pat. No. 8,485,875.

(60) Provisional application No. 60/589,736, filed on Jul. 21, 2004.

(51) Int. Cl.
*B08B 15/00* (2006.01)
*B63H 1/28* (2006.01)
*F04D 19/00* (2006.01)

(52) U.S. Cl.
CPC .................................. *F04D 19/002* (2013.01)

(58) Field of Classification Search
USPC ....... 454/370; 416/635, 244 R; 446/207, 236, 446/73
See application file for complete search history.

(56) References Cited

U.S. PATENT DOCUMENTS

| 6,179,564 | B1 | 1/2001 | Park |
| 6,312,137 | B1 * | 11/2001 | Hsieh ........................ B25B 9/00 362/294 |
| 7,775,848 | B1 | 8/2010 | Auerbach |
| 8,485,875 | B1 | 7/2013 | Auerbach |
| 2003/0228828 | A1 | 12/2003 | Coleman et al. |
| 2005/0239367 | A1 | 10/2005 | Fernandez, Jr. |

* cited by examiner

*Primary Examiner* — Helena Kosanovic
(74) *Attorney, Agent, or Firm* — Stites & Harbison, PLLC; David W. Nagle, Jr.

(57) ABSTRACT

A hand-held fan and object holder generally comprises: a housing that can be readily grasped and held by a user; a fan positioned near an upper end of the housing that rotates with respect to the housing and is powered by a motor and power source enclosed within the housing; and a candy item positioned at a lower end of the housing. A switch is positioned on an exterior surface of the housing between the fan and the candy item, allowing the user to selectively energize the motor and rotate the fan while grasping the housing. The resulting hand-held fan and object holder is a novelty product with great consumer appeal, especially to children.

13 Claims, 4 Drawing Sheets

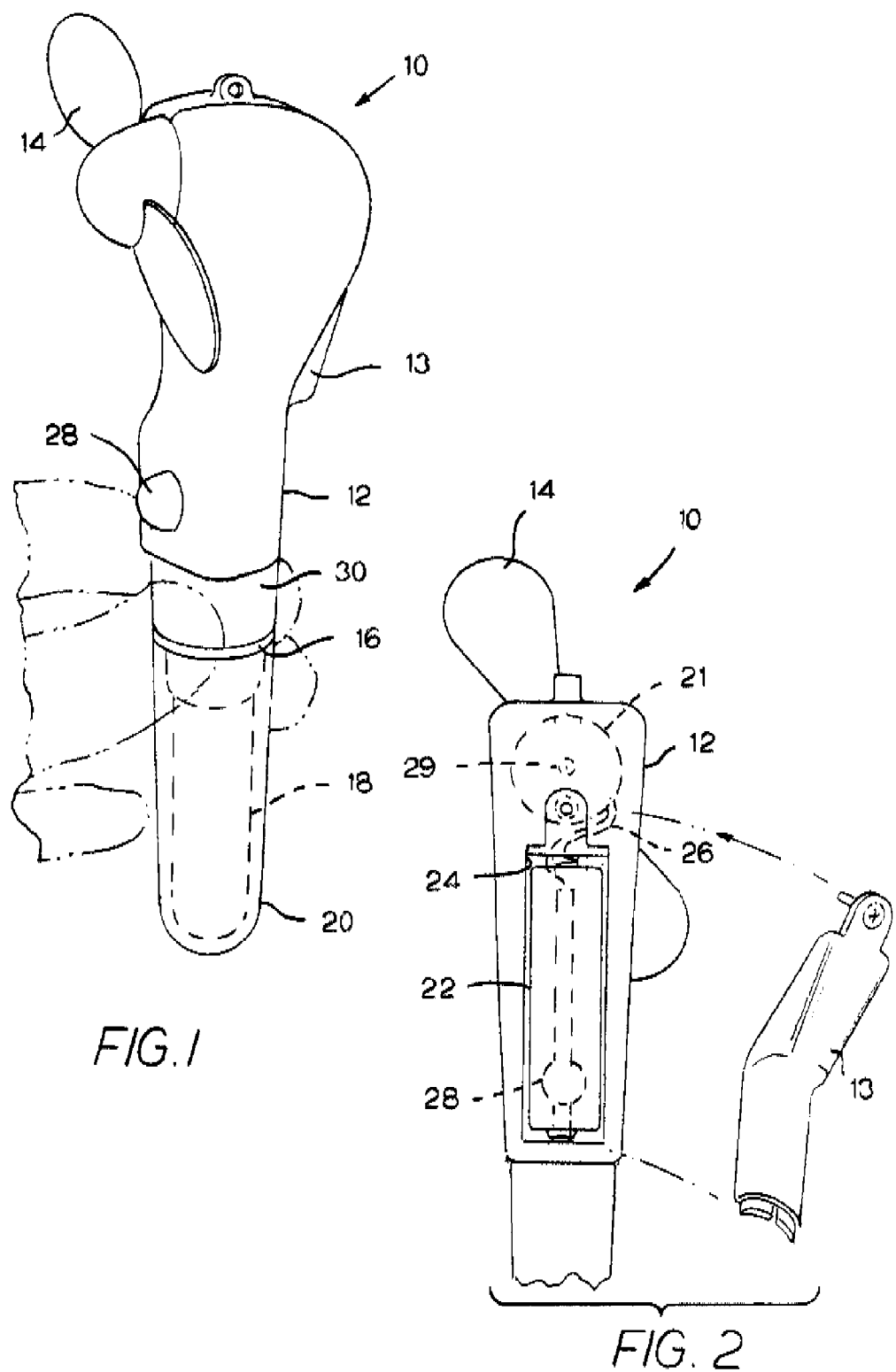

NOVELTY HAND-HELD FAN AND OBJECT HOLDER

CROSS-REFERENCE TO RELATED APPLICATIONS

The present application is a continuation of U.S. patent application Ser. No. 11/062,236 filed on Feb. 21, 2005, which claims priority to U.S. Provisional Application Ser. No. 60/589,736 filed on Jul. 21, 2004, the entire disclosures of which are incorporated herein by reference.

BACKGROUND OF THE INVENTION

The present invention relates to novelty and candy products designed primarily for children. Various such products are marketed through retail businesses, especially as "impulse items" that are displayed in checkout lanes or near the cashier. It is a paramount object of the present invention to provide a user-operable fan that is also capable of securing an object, such as a candy item, resulting in a product that has great consumer appeal, especially to children.

SUMMARY OF THE INVENTION

The present invention is a hand-held fan and object holder that is generally comprised of: a housing that can be readily grasped and held by a user; a fan positioned near an upper end of the housing that rotates with respect to the housing and is powered by a motor and power source enclosed within the housing; and a candy item positioned at a lower end of the housing. A switch is positioned on an exterior surface of the housing between the fan and the candy item, allowing the user to selectively energize the motor and rotate the fan while grasping the housing. The resulting hand-held fan and object holder is a novelty product with great consumer appeal, especially to children.

DESCRIPTION OF THE DRAWINGS

FIG. 1 is a perspective view of an exemplary hand-held fan and object holder made in accordance with the present invention;

FIG. 2 is a rear view of the exemplary hand-held fan and object holder of FIG. 1, in which the rear cover has been removed to allow access to a battery compartment;

DETAILED DESCRIPTION OF THE INVENTION

The present invention is a hand-held fan and object holder, a novelty product primarily for children.

Figure 3:
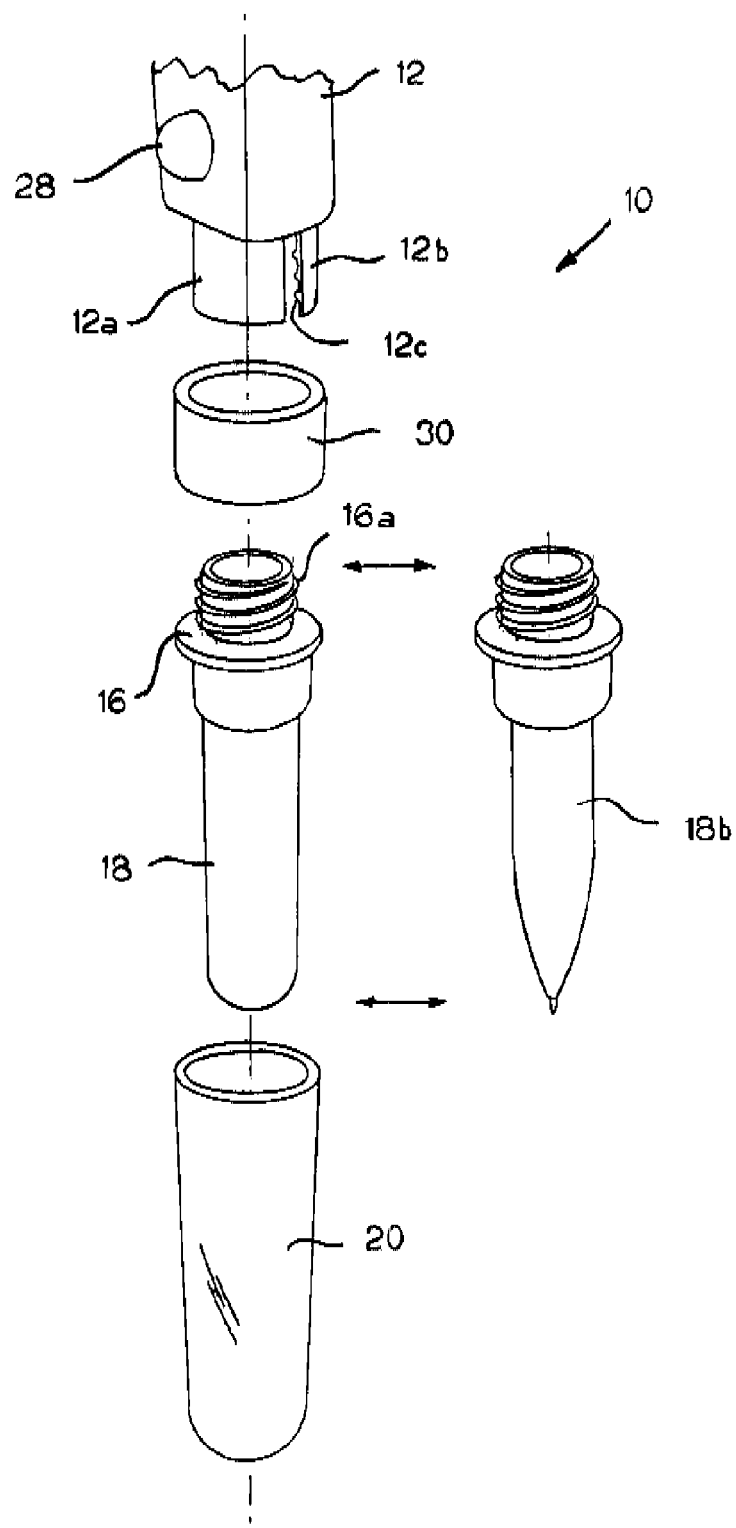
FIG. 3 is a partial exploded perspective view of the exemplary hand-held fan and object holder of FIG. 1.

FIGS. 1-3 are various views of an exemplary embodiment of a hand-held fan and object holder (generally indicated by reference numeral 10) made in accordance with the present invention. The hand-held fan and object holder 10 generally includes a housing 12; a fan 14 that rotates with respect to the housing 12; a coupling member 16 for securing an object 18 (e.g., a candy item) relative to the housing 12; and a sheath 20 that is selectively positioned over the object 18.

The housing 12 encloses the internal components that operate the fan 14. Specifically, as illustrated in FIG. 2, there is an internal cavity defined in the upper portion of the housing 12 that receives and retains a motor 21. The motor 21 is powered by a battery 22 that is received and retained in a battery compartment 24 defined by the housing 12. As also illustrated in FIG. 2, the housing 12 preferably includes a removable cover 13 that allows access to this battery compartment 24. In any event, a simple circuit is formed between the motor 21 and the battery 22 by wires (generally indicated by reference numeral 26) which are operatively connected to the positive and negative terminals of the battery 22 when it is received in the battery compartment 24. Finally, there is a simple spring-biased thumb switch 28 that allows the user to selectively close the circuit between the motor 21 and the battery 22 to energize the motor 21. When energized, the motor 21 turns a shaft 29, which extends through the housing 12, and rotates the fan 14.

Referring now to FIG. 3, at the lower end of the housing 12, there is a coupling member 16 for securing an object 18 to the housing 12. Specifically, in this exemplary embodiment, the housing 12 includes two downwardly extending projections 12a, 12b which define a substantially circular cavity with internal threads 12c. The coupling member 16 is provided with corresponding external threads 16a, so that the coupling member 16 can be selectively attached to the housing 12 through engagement of the respective threads 12c, 16a.

Referring still to FIG. 3, in most cases, it is contemplated that the object 18 is a candy item 18. In this exemplary embodiment, the candy item 18 is a hard candy, similar to a lollipop, with a substantially cylindrical or "lipstick" shape. This candy item 18 is secured to and extends downwardly from the coupling member 16. In this regard, although not illustrated in the Figures, the candy item 18 may be "molded" to and around a shaft that extends from the coupling member 16 along the axis of the candy item 18.

Alternatively, and as also illustrated in FIG. 3, the coupling member 16 may be designed to secure a ballpoint pen 18b relative to the housing. Furthermore, it is contemplated that a candy item, ballpoint pen, and/or additional items could be packaged together as part of the hand-held fan and object holder 10 to allow for selective detachment and attachment of each object. For example, when the candy item is finished, it could be replaced by the ballpoint pen.

Finally, in this exemplary embodiment, and as illustrated in FIG. 3, the hand-held fan and object holder 10 includes a sheath 20 that is selectively positioned over the object 18. This is especially important to the extent that the object 18 is a candy item as the sheath 20 fits over and frictionally engages the coupling member 16 to protect the candy item 18 from contaminants when it is not being consumed. Furthermore, in this exemplary embodiment, there is also a collar 30 that is interposed between the housing 12 and the coupling member 16. Accordingly, although not shown in the Figures, an adhesive label may be placed over and around a portion of the collar 30 and a portion of the sheath 20, temporarily sealing the sheath 20 and preventing access to the object 18 until the hand-held fan and object holder 10 is delivered to a consumer, at which time the seal can be broken.

Figures 4, 5:
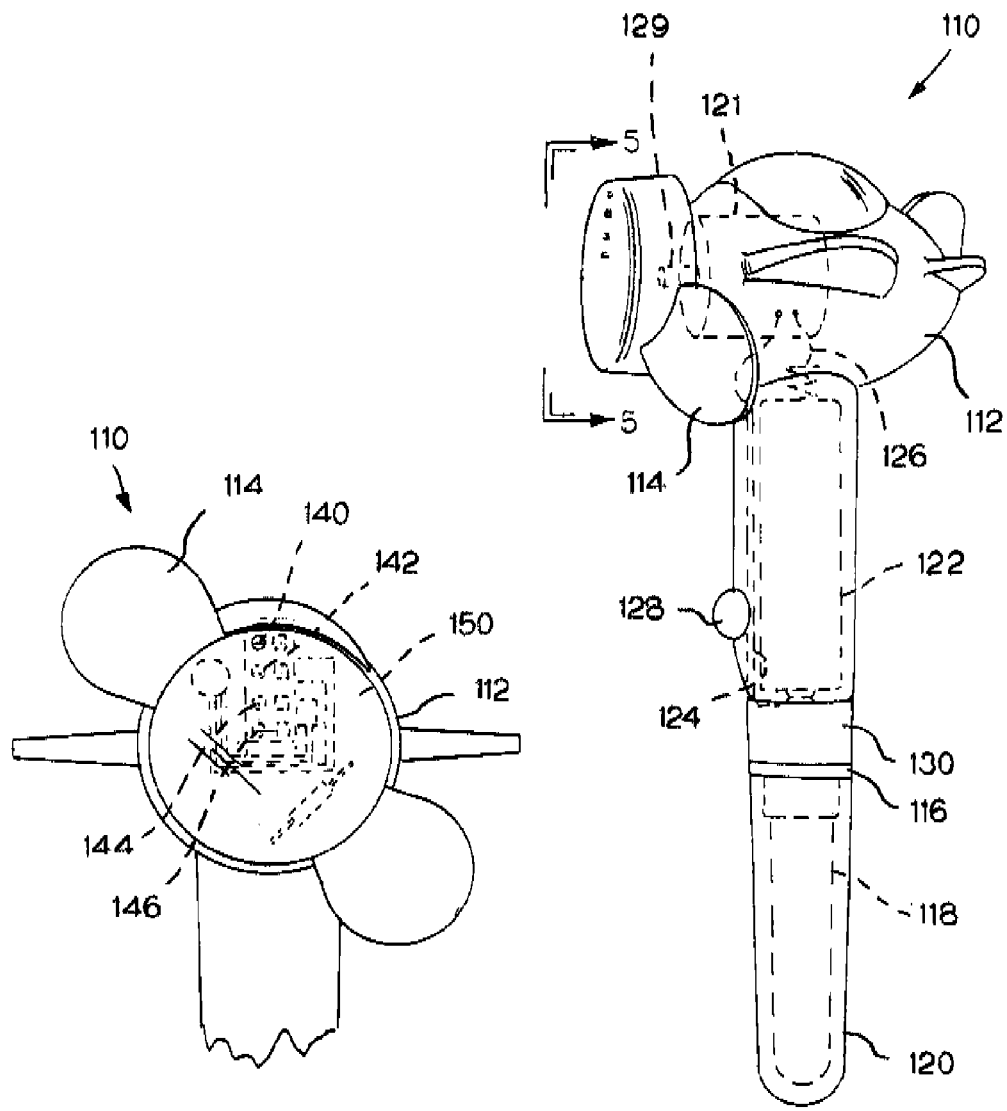
FIG. 4 is a perspective view of another exemplary hand-held fan and object holder made in accordance with the present invention.
FIG. 5 is partial front view of the exemplary hand-held fan and object holder of FIG. 4.

FIGS. 4-5 are views of another exemplary embodiment of a hand-held fan and object holder (generally indicated by reference numeral 110) made in accordance with the present invention. Similar to the embodiment described above with reference to FIGS. 1-3, the hand-held fan and object holder 110 generally includes a housing 112; a fan 114 that rotates with respect to the housing 112; a coupling member 116 for securing an object 118, such as a candy item, relative to the housing 112; and a sheath 120 that is selectively positioned over the object 118.

In this exemplary embodiment, the upper portion of the housing 112 is shaped like an airplane, with the fan 114 serving as the propeller of the airplane. In any event, the housing 112 still encloses the internal components that operate the fan 114. Specifically, as illustrated in FIG. 4, there is an internal cavity defined in the upper portion of the housing 112 that receives and retains a motor 121. The motor 121 is powered by a battery 122 that is received and retained in a battery compartment 124 defined by the housing 112. A simple circuit is formed between the motor 121 and the battery 122 by wires (generally indicated by reference numeral 126) which are operatively connected to the positive and negative terminals of the battery 122 when it is received in the battery compartment 124. Finally, there is a simple spring-biased thumb switch 128 that allows the user to selectively close the circuit between the motor 121 and the battery 122 to energize the motor 121. Once energized, the motor 121 turns a shaft 129, which extends through the housing 112, and rotates the fan 114.

Furthermore, although not shown in detail in FIG. 4, similar to the embodiment described above with reference to FIGS. 1-3, there is a coupling member 116 for securing a object 118 to the housing 112. The hand-held fan and object holder 110 also includes a sheath 120 that is selectively positioned over the object 118. The sheath 120 simply fits over and frictionally engages the coupling member 116 to protect the object 118 from contaminants when it is not being consumed. There is also a collar 130 that is interposed between the housing 112 and the coupling member 116. Accordingly, although not shown in the Figures, an adhesive label may be placed over and around a portion of the collar 130 and a portion of the sheath 120, temporarily sealing the sheath 120 and preventing access to the object 118 until the hand-held fan and object holder 110 is delivered to a consumer, at which time the seal can be broken.

In this exemplary embodiment, the hand-held fan and object holder 110 also includes a lighting feature. Specifically, as best illustrated in FIG. 5, the central hub 115 of the fan 114 is substantially translucent and defines an internal cavity for receiving one or more illumination devices. In this exemplary embodiment, the illumination devices are light-emitting diodes 140, 142, 144, 146 mounted to a circuit board 150, which also includes a power source, e.g., a battery. Also mounted to the circuit board 150 is a microswitch that is closed by the centrifugal forces resulting from rotation of the fan 114. As such, the light-emitting diodes 140, 142, 144, 146 are only illuminated while the fan 114 is rotating. Finally, the circuit board 150 may include an embedded software code for further control of the illumination of the light-emitting diodes 140, 142, 144, 146, for example, to create predetermined or random light patterns during rotation of the fan 114.

Figures 6, 7:
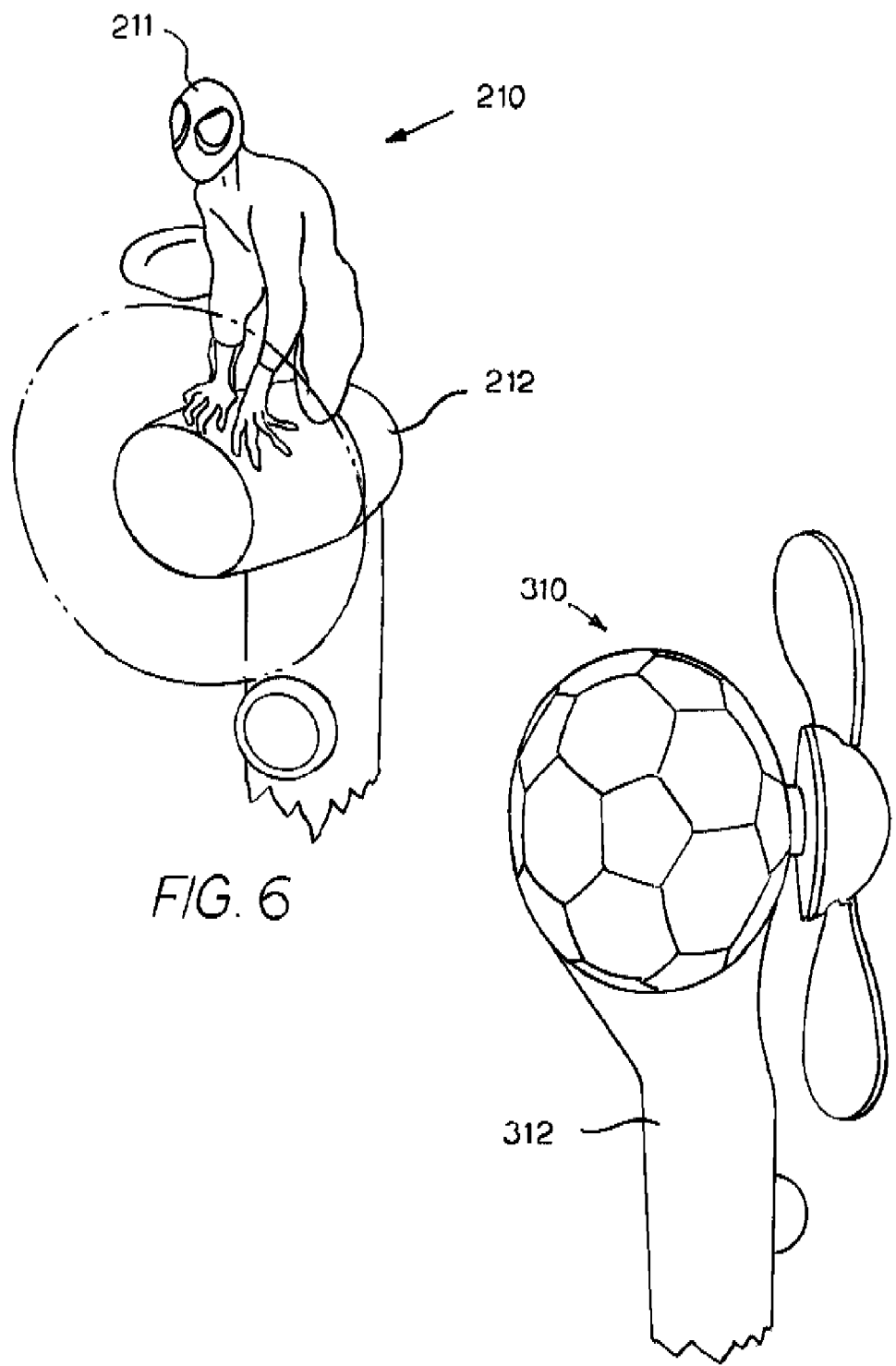
FIG. 6 is a partial perspective view of another exemplary hand-held fan and object holder made in accordance with the present invention, in which a figurine is secured or integral with the upper portion of the housing.
FIG. 7 is a partial perspective view of another exemplary hand-held fan and object holder made in accordance with the present invention, in which the upper portion of the housing is in the shape of soccer ball.

FIG. 6 is a partial perspective view of another exemplary hand-held fan and object holder 210 made in accordance with the present invention. In this particular embodiment, a figurine 211 is secured or integral with the upper portion of the housing 112. Such a figurine can be a likeness of a cartoon character or other person or animal of interest to a targeted demographic. Similarly, FIG. 7 is a perspective view of another exemplary hand-held fan and object holder 310 made in accordance with the present invention, in which the upper portion of the housing 312 is in the shape of soccer ball. Of course, various other shapes or design elements could be similarly incorporated into the housing to make the product more aesthetically pleasing and commercially desirable without departing from the spirit and scope of the present invention.

One of ordinary skill in the art will also recognize that additional embodiments are possible without departing from the teachings of the present invention or the scope of the claims which follow. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A hand-held fan and object holder, comprising:
   a housing that can be readily grasped and held by a user, said housing defining a vertical axis;
   a fan positioned near an upper end of the housing that, in use, rotates with respect to the housing about a substantially horizontal axis that is oriented substantially perpendicular to the vertical axis defined by the housing, said fan being powered by a motor and power source enclosed within the housing;
   a candy item positioned at a lower end of the housing; and
   a switch positioned on an exterior surface of the housing between the fan and the candy item, allowing the user to selectively energize the motor and rotate the fan while grasping the housing.

2. The hand-held fan and object holder as recited in claim 1, and further comprising a sheath that is selectively positioned over the candy item.

3. The hand-held fan and object holder as recited in claim 1, in which the motor is received and retained in an internal cavity defined in an upper portion of the housing, and wherein the power source is a battery that is received and retained in a battery compartment defined by the housing.

4. The hand-held fan and object holder as recited in claim 3, in which the housing includes a removable cover that allows access to the battery compartment.

5. The hand-held fan and object holder as recited in claim 1, wherein the fan includes a substantially translucent hub which defines an internal cavity for receiving one or more illumination devices.

6. The hand-held fan and object holder as recited in claim 5, wherein the one or more illumination devices are illuminated upon the closing of a microswitch due to the centrifugal forces resulting from rotation of the fan.

7. The hand-held fan and object holder as recited in claim 5, wherein the one or more illumination devices are light-emitting diodes.

8. A hand-held fan and object holder, comprising:
   a housing that can be readily grasped and held by a user, said housing defining a vertical axis;
   a fan positioned near an upper end of the housing that, in use, rotates with respect to the housing about a substantially horizontal axis that is oriented substantially perpendicular to the vertical axis defined by the housing, said fan being powered by a motor and power source enclosed within the housing;

a sheath extending from a lower end of the housing and defining an internal cavity;

a candy item stored in the internal cavity defined by the sheath; and a switch positioned on an exterior surface of the housing between the fan and the sheath, allowing the user to selectively energize the motor and rotate the fan while grasping the housing.

9. The hand-held fan and object holder as recited in claim 8, in which the motor is received and retained in an internal cavity defined in an upper portion of the housing, and wherein the power source is a battery that is received and retained in a battery compartment defined by the housing.

10. The hand-held fan and object holder as recited in claim 9, in which the housing includes a removable cover that allows access to the battery compartment.

11. The hand-held fan and object holder as recited in claim 8, wherein the fan includes a substantially translucent hub which defines an internal cavity for receiving one or more illumination devices.

12. The hand-held fan and object holder as recited in claim 11, wherein the one or more illumination devices are illuminated upon the closing of a microswitch due to the centrifugal forces resulting from rotation of the fan.

13. The hand-held fan and object holder as recited in claim 11, wherein the one or more illumination devices are light-emitting diodes.

* * * * *